United States Patent
Chung (12)

(10) Patent No.: US 10,511,342 B1
(45) Date of Patent: Dec. 17, 2019

(54) CELL PHONE CASE WITH CARD STORAGE CAPABILITY

(71) Applicant: ISPEAKER CO., LTD., Goyang-Si, Gyeonggi-Do (KR)

(72) Inventor: Young Suk Chung, Goyang-Si (KR)

(73) Assignee: ISPEAKER CO., LTD. (KR)

( * ) Notice: Subject to any disclaimer, the term of this patent is extended or adjusted under 35 U.S.C. 154(b) by 0 days.

(21) Appl. No.: 16/352,763

(22) Filed: Mar. 13, 2019

Related U.S. Application Data

(60) Provisional application No. 62/730,529, filed on Sep. 12, 2018.

(51) Int. Cl.
| | |
|---|---|
| *H04B 1/00* | (2006.01) |
| *H04B 1/3888* | (2015.01) |
| *H04M 1/02* | (2006.01) |
| *A45C 11/18* | (2006.01) |
| *A45C 11/00* | (2006.01) |

(52) U.S. Cl.
CPC .......... *H04B 1/3888* (2013.01); *A45C 11/182* (2013.01); *H04M 1/0202* (2013.01); *A45C 2011/002* (2013.01)

(58) Field of Classification Search
CPC ................ H04B 1/3888; A45C 11/182; A45C 2011/002; H04M 1/0202
See application file for complete search history.

(56) References Cited

U.S. PATENT DOCUMENTS

| | | | |
|---|---|---|---|
| 9,936,780 B2 * | 4/2018 | Tu .................. | H04B 1/3888 |
| 2016/0088912 A1 * | 3/2016 | Lawson ................ | A45C 11/00 206/38 |
| 2017/0026498 A1 * | 1/2017 | Goldfain .............. | A45C 11/182 |
| 2018/0191395 A1 * | 7/2018 | Chung ................ | H04B 1/3888 |

FOREIGN PATENT DOCUMENTS

| | | | | |
|---|---|---|---|---|
| KR | 101568165 B1 | 11/2015 | | |
| KR | 20180000021 U | 1/2018 | | |
| KR | 20180049770 A | * 5/2018 | | |
| KR | 20180002151 U | 7/2018 | | |
| WO | WO-2017222109 A1 | * 12/2017 | ............. | A45C 11/00 |

* cited by examiner

*Primary Examiner* — Khai M Nguyen
(74) *Attorney, Agent, or Firm* — Renaissance IP Law Group LLP

(57) ABSTRACT

Provided is a cell phone case capable of storing a card, and more particularly, a cell phone case which can open/close a card storing space by using and semi-automatically sliding elastic slide hooks, and is configured such that a case main body, a card storage part, and an opening/closing cover can all be decoupled/coupled.

4 Claims, 9 Drawing Sheets

(a)  (b)

(a)  (b)

CELL PHONE CASE WITH CARD STORAGE CAPABILITY

CROSS-REFERENCE TO RELATED APPLICATION

This application claims priority to U.S. Patent Application No. 62/730,529 filed on Sep. 12, 2018 and Korean Utility Model Application No. 20-2019-0000193 filed on Jan. 14, 2019 and all the benefits accruing therefrom under 35 U.S.C. § 119, the contents of which are incorporated by reference in their entirety.

BACKGROUND

The present disclosure herein relates to a cell phone case, and more particularly, to a cell phone case capable of storing cards including a credit card, a digital ID, or the like.

In the past, cell phones were used for communication with other people through telephone calls and message transmission and reception, but the cell phones have recently been used in various fields due to innovative advancement in technology related to cell phones. Accordingly, cell phones have deep places in life as an indispensible article of modern people and are always being carried anytime and anywhere. Since cell phones become indispensible articles in daily life and external shock may easily be applied to the cell phones due to user's carelessness, users are using various types of cell phone cases for cell phone protection function.

Meanwhile, in modern society, various cards such as credit cards, check cards, and identification cards may be one of indispensible articles in daily life, and users carry a separate card pulse in order to carry several cards.

As such, when separately carrying a cell phone and a card pulse, a user has inconvenience of preparing both the cell phone and the card pulse and thereby has danger of losing either thereof.

Thus, a cell phone case is being demanded which is capable of both card storage function and cell phone protection function without separately carrying a cell phone and a card which become indispensible articles for daily life.

SUMMARY

The present disclosure provides a cell phone case capable of card storage in order to achieve the above-mentioned purposes.

In accordance with an exemplary embodiment, a cell phone case includes: a case main body (100) having a frame case shape and provided with, on a front surface thereof, a cell phone accommodation part (110) configured to accommodate a cell phone in a shape of surrounding a rear surface and side surfaces of the cell phone; a card storage part (120) formed so as to be decoupled/coupled from/to the case main body (100) and configured to store a card; and an opening/closing cover (200) provided on a rear surface of the case main body (100) and configured to slide on and open/close the card storage part (120) coupled to the case main body (100), wherein the case main body (100) includes an opening (150) configured to accommodate the card storage part (120).

Specifically, the card storage part (120) may include: a card mount part (122) on which a card is mounted; and upper/lower coupling parts (124, 126) configured to allow the opening/closing cover (200) to be decoupled/coupled from/to the card storage part (120).

Meanwhile, the cell phone case may further include: slide hooks (300) configured to provide an elastic force when the opening/closing cover (200) slides on and opens/closes the card mount part (122) of the card storage part (120}, wherein: a boundary line frame (160) corresponding to boundary lines between the card mount part (122) and the upper/lower coupling parts (124, 126) may be provided on a predetermined region of the opening (150) of the case main body (100); first coupling protrusions (129), connected to second end portions of the slide hooks (300) configured to elastically couple the case main body (100) and the opening/closing cover (200), may be provided on the boundary line frame (160); and second coupling protrusions (220) connected to first end portions of the slide hooks (300) may be provided on an inner surface of the opening/closing cover (200).

Meanwhile, the cell phone case may further include: slide hooks (300) configured to provide an elastic force when the opening/closing cover (200) slides on and opens/closes the card mount part (122) of the card storage part (120), wherein: a boundary line frame (160) corresponding to boundary lines between the card mount part (122) and the upper/lower coupling parts (124, 126) may be provided on a predetermined region of the opening (150) of the case main body (100); first coupling grooves, connected to second end portions of the slide hooks (300) configured to elastically couple the case main body (100) and the opening/closing cover (200), may be provided on the boundary line frame (160); and second coupling grooves connected to first end portions of the slide hooks (300) may be provided on an inner surface of the opening/closing cover (200); and coupling protrusions formed on the first end portions and the second end portions of the slide hooks (300) may be flexibly coupled to the respective first and second coupling grooves.

Meanwhile, the cell phone case may further include: slide hooks (300) configured to provide an elastic force when the opening/closing cover (200) slides on and opens/closes the card mount part (122) of the card storage part (120), wherein: a boundary line frame (160) corresponding to boundary lines between the card mount part (122) and the upper/lower coupling parts (124, 126) may be provided on a predetermined region of the opening (150) of the case main body (100); first coupling grooves, connected to second end portions of the slide hooks (300) configured to elastically couple the case main body (100) and the opening/closing cover (200), may be provided on the boundary line frame (160); second coupling grooves connected to first end portions of the slide hooks (300) may be provided on an inner surface of the opening/closing cover (200); and coupling through holes formed on the first end portions and the second end portions of the slide hooks (300) may be flexibly coupled to the respective first and second coupling grooves via first and second coupling pins.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1:
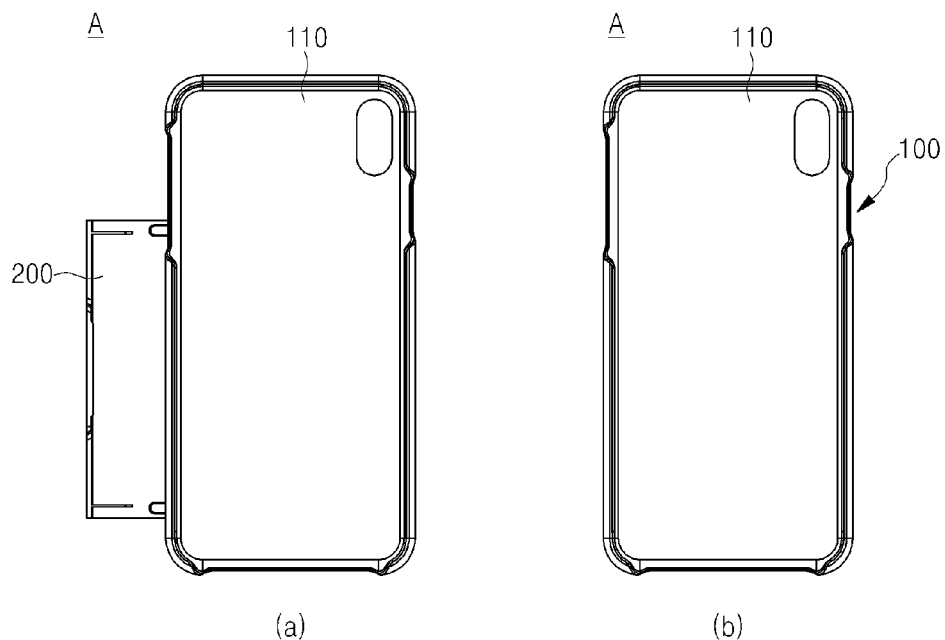
FIG. 1 is a view illustrating a front surface part A of a case main body showing a cell phone accommodation part.

Hereinafter, embodiments of the present disclosure will be described in detail with reference to the accompanying drawings so that the present disclosure may easily be carried out by a person with ordinary skill in the art to which the invention pertains. The present disclosure may, however, be embodied in different forms and should not be construed as limited to the embodiments set forth herein. In the drawings, anything unnecessary for describing the present disclosure will be omitted for clarity, and like reference numerals in the drawings denote like elements.

Although the terms such as "first" and "second" are used herein to describe various elements, these elements should not be limited by these terms. The terms are only used to distinguish one component from other components. For example, without departing from the scope of the present invention, a first component may be referred to as a second component, and similarly, the second component may also be referred to as the first component. The terms used in the present disclosure are used only for explaining a specific exemplary embodiment while not limiting the present disclosure. The terms of a singular form may include plural forms unless referred to the contrary.

In this specification, when one part is referred to as being "connected" to another part, it should be understood that the former can be 'directly connected' to the latter, or "electrically connected" to the latter via an intervening part. Furthermore, when it is described that one part "includes" some components, it does not mean that other components are excluded but means that other elements may be further included if there is no specific contrary indication. The terms "step of (performing)" or "step of (doing)" used in the entire specification of the present disclosure does not mean "step for".

Terms used in the present invention is selected as general terms as widely used as possible while considering functions in the present invention, but these may be changed according to intent of a person skilled in the art, a precedent, an advent of new technique, or the like. In addition, in a specific case, there are terms arbitrarily selected by applicants, and in this case, the meaning of the terms will be described in detail in the corresponding description part of the present invention. Accordingly, the terms used in the present invention should be defined on the basis of the meanings the terms have and the contents of the entirety of the present invention rather than defined by simple names of the terms.

Hereinafter with reference to drawings, a structure of a cell phone case in accordance with an exemplary embodiment will be described in detail.

1. Structure

Example 1—Integral Type

A cell phone case in accordance with example 1 of the exemplary embodiment is constituted by an integral structure of a case main body 100 and a card storage part 120, and specifically includes: the case main body 100 having a cell phone accommodation part 110 formed on the front surface thereof to accommodate a cell phone in a shape surrounding the rear surface and side surfaces of the cell phone, and a card storage part 120, in which a card is stored, on the rear surface thereof; an opening/closing cover 200 coupled to the rear surface of the case main body so as to slide on and open and close the card storage part 120; and slide hooks 300 which elastically couples the case main body 100 and the opening/closing cover 200.

1.1 Case Main Body 100

A. Cell Phone Accommodation Part 110

FIG. 1 is a view illustrating a front surface part A of the case main body which shows the cell phone accommodation part, (a) of FIG. 1 illustrates a state in which the opening/closing cover opens the card storage part, and (b) of FIG. 1 illustrates a state in which the opening/closing cover closes the card storage part. As shown in FIG. 1, the cell phone accommodation part formed on the front surface of the case main body accommodates a cell phone in a shape of surrounding the rear surface and side surfaces of the cell phone to thereby protect the cell phone.

B. Card Storage Part 120

Figure 2:
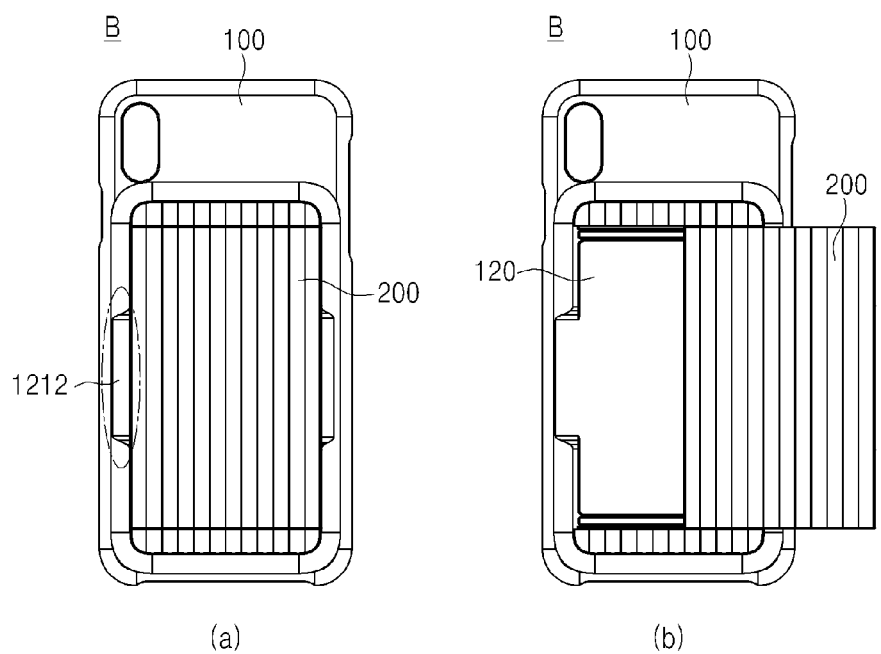
FIG. 2 is a view illustrating a rear surface part B of the case main body showing a card storage part.

FIG. 2 is a view illustrating a rear surface part B of the case main body showing the card storage part, (a) of FIG. 2 shows a state in which the opening/closing cover closes the card storage part, and (b) of FIG. 2 shows a state in which the opening/closing cover opens the card storage part.

1) Card Storage Guides 120*a*-120*d*

Figure 3:
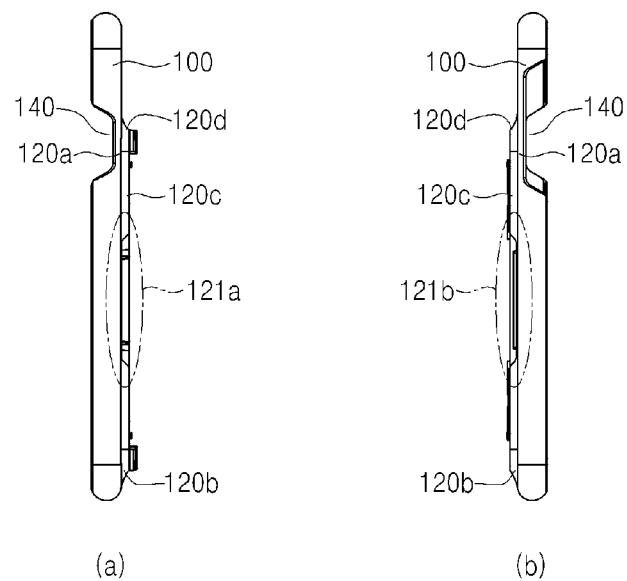
FIG. 3 is a view illustrating a state in which the card storage part is viewed from left and right sides thereof.

FIG. 3 is a view illustrating a state in which the card storage part is viewed from left and right sides thereof. Referring to FIG. 3, a card storage guide, having a different height than the bottom surface of the case main body 100, protrudes on the rear surface of the case main body 100, and the card storage part 120 for storing a card is formed by the card storage guide.

The bottom surface of the card storage part is formed to have the same height as the bottom surface of the case main body 100 outside the card storage part without a height difference, but the card storage guide protrudes on the periphery of the card storage part 120 from the bottom surface and thereby forms the card storage part 120. That is, the card storage guide means a boundary wall which forms the card storage part 120. A change in position of the stored card is prevented by the card storage guide formed as such.

Here, the height difference between the bottom surface of the card storage part and the card storage guide may be set so that one or more cards may be stored.

In addition, the card storage guide formed on the left and right sides of the case main body 100 may include first and second stepped parts 121*a* and 121*b* which are formed in heights smaller than the heights of other card storage guides.

Referring to FIG. 3, the left card storage guide 120a and the right card storage guide 120c is respectively provided with stepped parts 121a and 121b. Here, as shown in (a) of FIG. 3, the first stepped part 121a formed in the left card storage guide 120a may be provided with a card extraction groove 1212 for facilitating the extraction of the stored card. Unlike the card storage guides 120a-120d which protrude from the bottom surface of the card storage part 120 and having different heights, the first stepped part 121a is formed in the same height as the bottom surface of the card storage part 120, and thus facilitates the extraction of the card being into close contact with the bottom surface of the card storage part 120. In addition, as shown in (a) of FIG. 2, while the opening/closing cover completely closes the card storage part 120, the operation for opening the opening/closing cover 200 may be facilitated by using the card extraction groove 1212 formed in the stepped part 121. If there is no such a card extraction groove 1212, while the opening/closing cover 200 completely closes the card storage part 120, in order to open the opening/closing cover 200, a user has to open the opening/closing cover 200 by pushing out the surface of the opening/closing cover 200 with a finger, but this may not be easy due to friction between the opening/closing cover 200 and the finger of the user. However, the cell phone case according to an exemplary embodiment is provided with the first stepped part 121a in the left card storage guide 120a so that the card extraction groove 1212 is formed when the opening/closing cover 200 completely closes the card storage part 120, and thus, allows the user to easily open the opening/closing cover 200 even while the opening/closing cover 200 completely closes the card storage part 120.

Meanwhile, the second stepped part 121b formed in the right card storage guide 120c is a portion which is coupled to face a cover extension part 230, formed on the right side of the opening/closing cover 200, when the opening/closing cover 200 is completely coupled to the case main body 100 to be described later. The second stepped part 121b has a smaller height than other card storage guides 120b and 120d, but is not formed in the same height as the bottom surface of the card storage part 120, and when the opening/closing cover 200 is completely coupled, the second stepped part 121b is configured to form a space so as to be spaced apart a certain distance from the cover extension part 230, and thus may facilitate the opening/closing cover 200 to be completely separated from the case main body 100. The cover extension part 230 will be described in more detail below.

2) Card Mount Part 122

Figure 4:
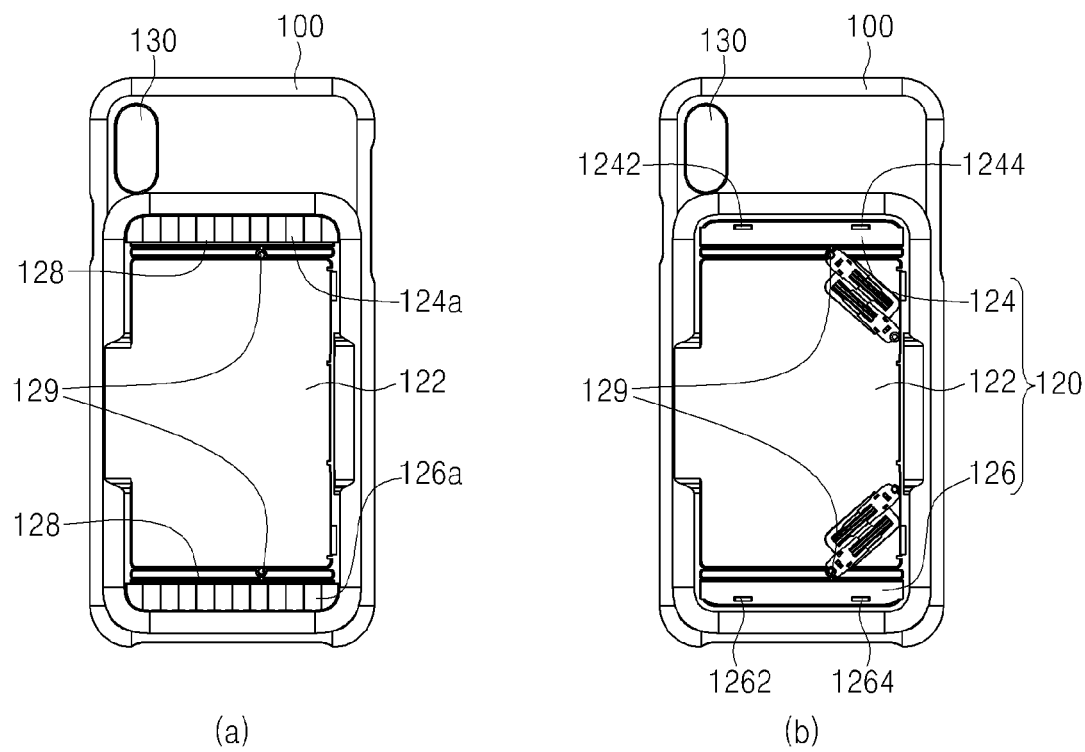
FIG. 4 is a view illustrating the card storage part after removing an opening/closing cover.

FIG. 4 is a view illustrating the card storage part after removing the opening/closing cover. Referring to FIG. 4, a portion on which a card is specifically mounted in the card storage part 120 is separately described as a card mount part 122. The card mount part 122 has a shape so that general cards, such as a credit card, an employee identification card, and a digital id, may be mounted thereon, and may be formed in a size which is the same as or slightly larger than the general cards.

3) Upper/Lower Coupling Parts 124 and 126, and Upper/Lower Coupling Part Covers 124a and 126a Excluding the card mount part 122 on which a card is mounted, the remaining portions of the card storage part 120 are separately described as an upper coupling part 124 and a lower coupling part 126. As shown in (b) of FIG. 4, the upper portion of the card storage part 120 excluding the card mount part 122 may be divided into the upper coupling part 124 and the lower portion may be divided into a lower coupling part 126.

An upper coupling part cover 124a and a lower coupling part cover 126a, which have structures that can be coupled to or decoupled from the case main body 100 and which have shapes respectively corresponding to the upper coupling part 124 and the lower coupling part 126, may be provided and coupled as shown in (a) of FIG. 4.

That is, as shown in (a) of FIG. 4, the upper/lower coupling part covers 124a and 126a may respectively be coupled to the upper/lower coupling parts 124 and 126, and as shown in (b) of FIG. 4, may also be decoupled from the respective upper/lower coupling parts 124 and 126. That is, aside from the opening/closing cover 200 for opening/closing the card mount part 122, the upper/lower coupling part covers 124a and 126a are provided which have structures that can be coupled to or decoupled from the upper/lower coupling parts 124 and 126 of the case main body 100. As shown in FIG. 4, the coupling/decoupling of the upper/lower coupling part covers 124a and 126a to/from the upper/lower coupling parts 124 and 126 may be possible through a structure in which a plurality of protruding parts 1242, 1244, 1262 and 1264, which are formed on the upper/lower end bottom surfaces of the card storage part 120, and recess parts (not shown) formed corresponding to the protrusion parts on an inner sides of the upper/lower coupling part covers 124a and 126a are coupled to each other.

As such, the upper/lower coupling part covers 124a and 126a are provided which have structures that can be coupled to or decoupled from the upper/lower coupling parts 124 and 126, and thus, if necessary, a user may use the upper/lower coupling part covers 124a and 126a by changing, for example, colors. Therefore, improved aesthetic property and effectiveness may be achieved.

4) Sliding Hinge Accommodation Parts 128

Figure 11:
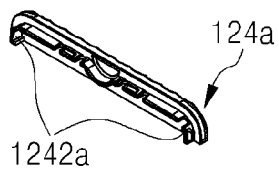
FIG. 11 is a perspective view illustrating lower surfaces of an upper/lower coupling parts cover in accordance with an exemplary embodiment.
Figure 11:
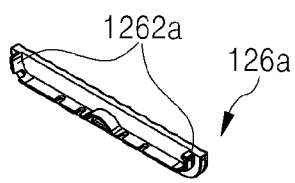

Between the lower surfaces of the upper/lower coupling part covers 124a and 126a and the upper surface of the card storage part 120, sliding hinge accommodation parts 128 are formed which accommodates sliding hinges 210 provided on the upper/lower ends of the opening/closing cover 200 to be described later. As shown in (a) of FIG. 4, when the upper/lower coupling part covers 124a and 126a are coupled to the upper/lower coupling parts 124 and 126 by means of sliding hinge support structures 1242a and 1262a, which are shown in FIG. 11 and are formed on the lower surfaces of the upper/lower coupling part covers 124a and 126a, the sliding hinge accommodation parts 128 for accommodating the sliding hinges 210 of the opening/closing cover 200 is formed between the sliding hinge support structures 1242a and 1262a and the upper surface of the card storage part 120, so as to guide the opening/closing of the opening/closing cover 200.

5) First Coupling Protrusions 129

First coupling protrusions 129 are portions for connecting slide hooks 300 which couples the case main body 100 and the opening/closing cover 200, and, as shown in FIG. 4, are formed in respective upper/lower portions of the bottom surface of the card storage part 120 in the longitudinal direction of the card storage part 120. More specifically, the first coupling protrusions 129 are formed, on the bottom surface of the card storage part 120, at certain positions in the respective boundary lines between the card mount part 122 and the upper/lower coupling parts 124 and 126. First coupling grooves 314 of the slider hook 300 to be described later are coupled to the respective first coupling protrusions 129.

In a second example of the decoupled-type (decouple/couple-type) card storage part 120, the first coupling protrusions 129 may be formed in a predetermined region of a boundary line frame 160 to be described later.

C. Camera Hole 130

As shown in FIG. 4, a camera hole 130 is formed in an upper portion of the case main body 100 and prevents the case from occluding a camera when using the cell phone camera.

D. Function Key Exposition Parts 140

In addition, in side surfaces of the case main body 100, function key exposition parts 140 having shapes stepped corresponding to positions of function keys of the cell phone are formed, and thus, even when the cell phone is stored in the case main body 100, the function keys may be easily operated. (see FIG. 3)

1.2 Opening/Closing Cover 200

The opening/closing cover 200 is a component, which is coupled to the rear surface of the case main body 100 and slides on and opens/closes the card storage part 120, and has detailed components as follows.

A. Sliding Hinges 210

Figure 5:
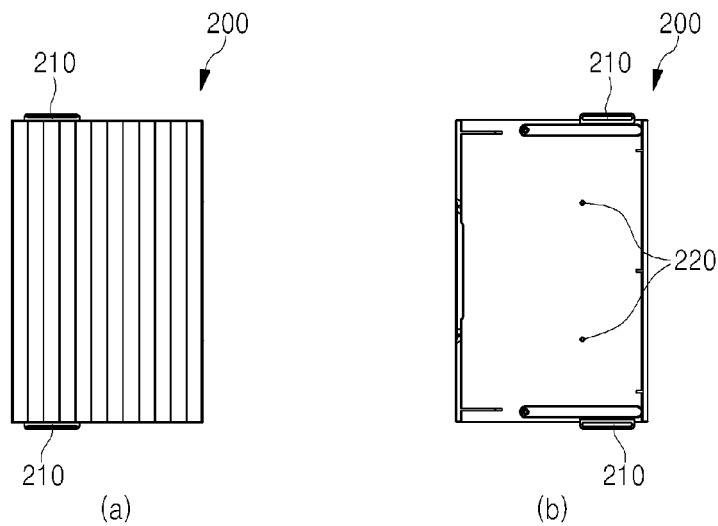
FIG. 5 is a view illustrating a separated opening/closing cover in accordance with an exemplary embodiment.

FIG. 5 is a view illustrating a decoupled opening/closing cover of the exemplary embodiment, (a) of FIG. 5 is a view illustrating the outside of the opening/closing cover, and (b) of FIG. 5 is a view illustrating the inside (inner surface) of the opening/closing cover.

Referring to FIG. 5, sliding hinges 210 are formed on the upper/lower ends of the opening/closing cover 200. The sliding hinges 210 are inserted into the sliding hinge accommodation parts 128, formed between the lower surfaces of the upper/lower coupling part covers 124a and 126a and the upper surface of the card storage part 120, and guides the sliding and opening/closing of the opening/closing cover 200. Accordingly, by means of the structure in which the sliding hinges 210 are accommodated in the sliding hinge accommodation parts 128, the opening/closing cover 200 may slide and open/close with respect to the case main body 100.

B. Second Coupling Protrusions 220

Figure 6:
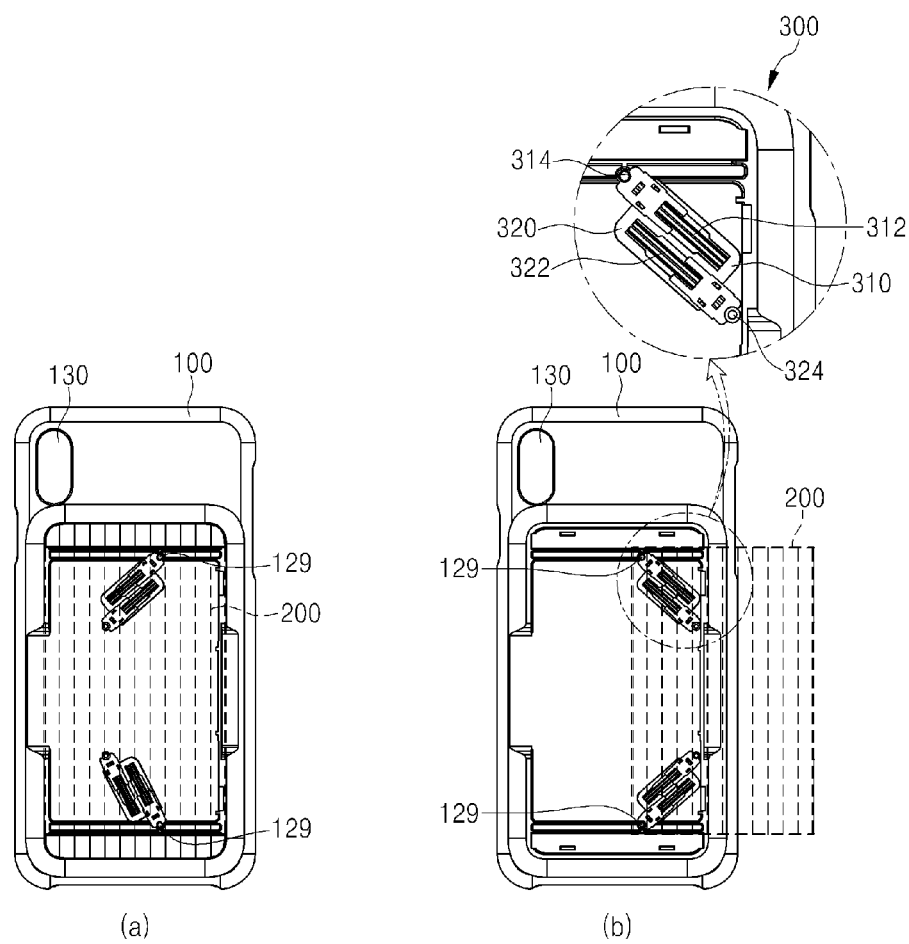
FIG. 6 is a view illustrating a connected state of the opening/closing cover through a sliding hook.

Meanwhile, as shown in FIG. 5, second coupling protrusions 220 are formed so as to face each other in upper/lower portions of the inner surface the opening/closing cover 200. The second coupling protrusions 220 are connected to second coupling grooves 324 of the slide hooks 300. Accordingly, as shown in FIG. 6, the case main body 100 and the opening/closing cover 200 may be coupled through a structure in which the first coupling protrusions 129 formed on the bottom surface of the card storage part 120 are connected to the first coupling grooves 314 of the slide hooks 300, and the second coupling protrusions 220 formed inside the opening/closing cover 200 are connected to the second coupling grooves 324 of the slide hooks 300.

In addition, the second coupling protrusions 220 may be formed as second coupling grooves (not shown) which do not have protrusion shapes, but have groove shapes, and in this case, coupling protrusions formed on connection end portions of the slide hooks may be coupled to the second coupling grooves, or the second coupling grooves may be coupled by means of coupling pins (not shown) passing through coupling through holes (not shown) formed on the connection end portions of the slide hooks to be coupled.

C. Cover Extension Part 230

Figure 9:
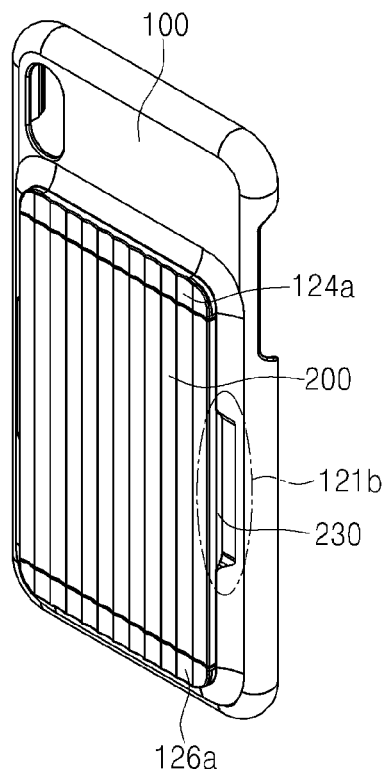
FIG. 9 is a perspective view illustrating a state in which the opening/closing cover is attached to the case main body.
Figure 10:
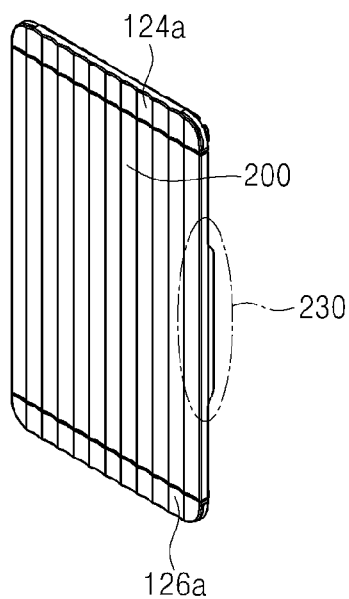
FIG. 10 is a perspective view illustrating a state in which the case main body is removed from FIG. 9.

Referring to FIG. 10, the cover extension part 230 which has a shape extending in the vertical direction is provided on the right side of the opening/closing cover 200. The cover extension part is formed in a structure of being coupled to a second stepped part 121b formed on the right card storage guide 120c among the card storage guides 120a-120d. Here, as shown in FIG. 9, when the opening/closing cover 200 is coupled to the case main body 100, the cover extension part 230 may be provided so as to from a space to be spaced apart a certain distance from the second stepped part 121b. The cover extension part 230 is configured not to completely cover the second stepped part 121b but to form a space between the cover extension part 230 and the second stepped part 121b, so that the opening/closing cover 200 may easily be coupled/decoupled to/from the case main body 100. When the opening/closing cover 200 is completely coupled to the case main body 100 as shown in FIG. 9, the opening/closing cover 200 may be stably mounted without further pushed leftward due to the stopping function of the cover extension part 230, and when the opening/closing cover 200 is pushed rightward and is completely decoupled from the case main body 100, the opening/closing cover 200 may easily be decoupled due to the space formed between the cover extension part 230 and the second stepped part 121b. Through such a structure, if necessary, a user may change and use the opening/closing cover 200, for example, with a different color. Therefore, improved aesthetic property and effectiveness may be achieved.

1.3 Slide Hooks 300

The slide hooks 300 are components for elastically coupling the case main body 100 and the opening/closing cover 200, and as shown in an enlarged portion of the slide hooks in FIG. 6, the slide hooks 300 are each formed in a shape in which a first coupling pin 310 and a second coupling pin 320 are connected.

A. First Coupling Pins 310

The first coupling pins 310 are each composed of a first spring 312 and a first coupling groove 314. The first springs 312 are coupled in a shape integrated in the central portion of the first coupling pins 310. In addition, as described above, the first coupling grooves 314 are portions to which the first coupling protrusions 129 formed on the bottom surface of the card storage part 120 are coupled respectively.

B. Second Coupling Pins 320

The second coupling pins 320 are each composed of a second spring 322 and a second coupling groove 324. The second springs 322 are also coupled in a shape integrated in the central portions of the second coupling pins 320 like the first springs 312. In addition, as described above, the second coupling grooves 324 are portions to which the second coupling protrusions 220 formed on the inner surface of the opening/closing cover 200 are coupled.

Here, the first springs 312 may also be composed of other elastic materials such as rubber aside from a spring.

As shown in FIG. 6, the case main body 100 and the opening/closing cover 200 may be connected by means of the slide hooks 300 configured as such. In addition, the opening/closing cover 200 may semi-automatically slide with respect to the card storage part 120 by means of the first and second springs 312 and 322 formed of an elastic material included in the slide hooks 300. Thus, the opening/closing cover 200 may open/close by applying only a small force to the opening/closing cover 200 coupled to the case main body 100. Thus, improved aesthetic property and effectiveness may be achieved.

Example 2—Decoupling/Coupling Type

Figure 12:
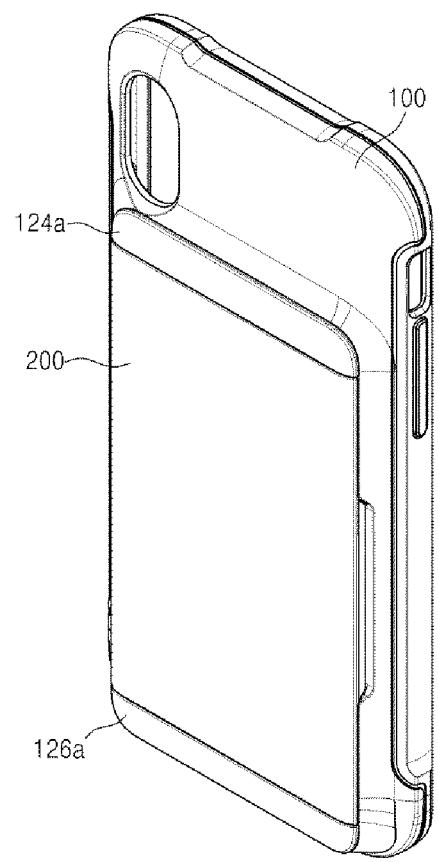
FIG. 12 is a view illustrating an overall state of decoupled/coupled type in accordance with another exemplary embodiment.
Figure 13:
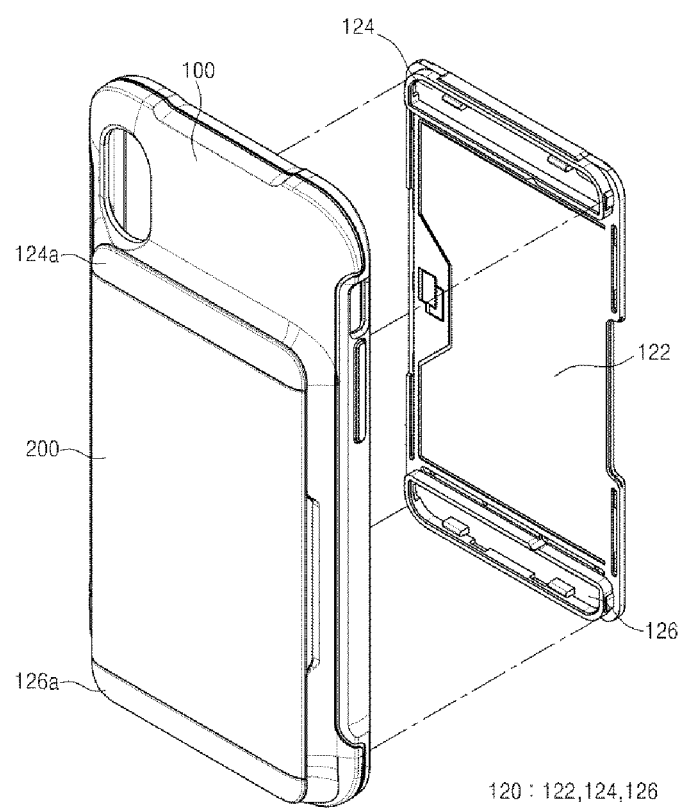
FIG. 13 is a view illustrating a state in which a card storage part is decoupled from the state of FIG. 12.
Figure 14:
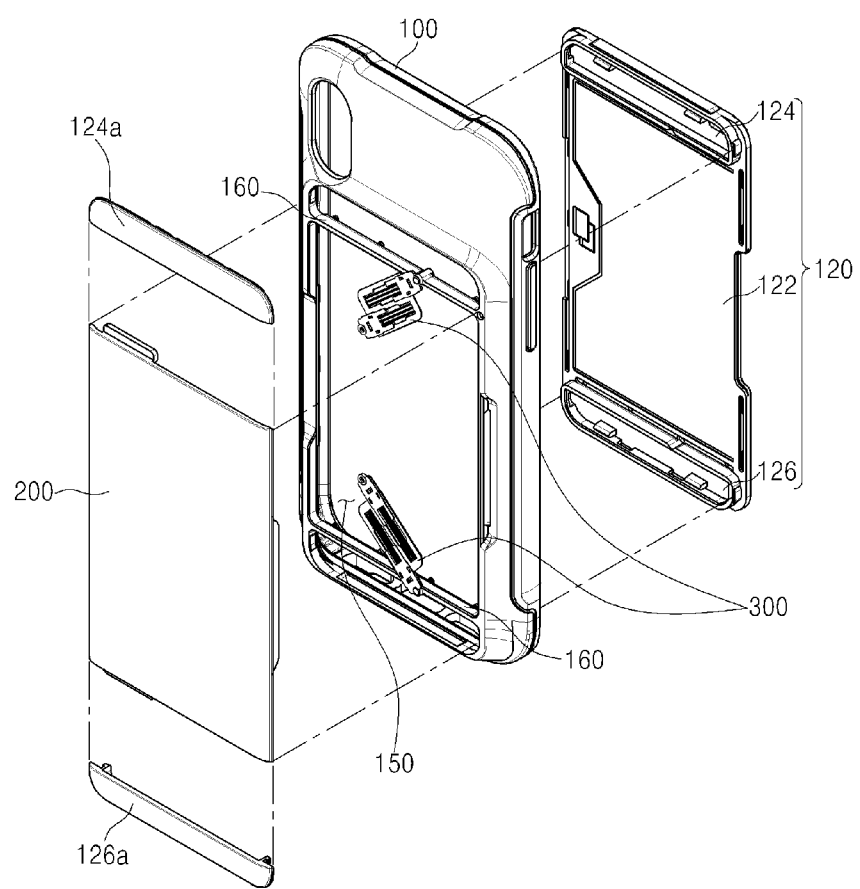
FIG. 14 is a view illustrating a state in which a case main body, a card storage part, an opening/closing cover, and a lower/upper coupling part cover are all decoupled.

Referring to FIGS. 12 to 14, example 2 of exemplary embodiments will be described. Example 2 of exemplary embodiments may be formed in a decouple/couple structure in which the case main body 100 and the card storage part 120 may be decoupled/coupled, unlike the structure of above-mentioned example 1 in which the case main body 100 and the card storage part 120 are integrated.

Firstly, FIG. 12 is a view illustrating a state in which a case main body 100, a card storage part 120, and an opening/closing cover 200 are all coupled, and FIG. 13 is a view illustrating a state in which the card storage part 120 is decoupled from the case main body in the state like that in FIG. 12. More specifically, FIG. 14 is a view illustrating a state in which the case main body 100, the card storage part 120, upper/lower coupling covers 124*a* and 126*a*, and the opening/closing cover 200 are all decoupled.

Referring to FIG. 14, a case main body 100 in accordance with example 2 of exemplary embodiments may have a frame case shape including a camera hole 130 and an opening 150 corresponding to a card storage part 120. The opening part 150 has a shape corresponding to the card storage part 120, and a boundary line frame 160 corresponding to boundary lines between a card mount part 122 of the card storage part 120 and upper/lower coupling parts 124 and 126. Such the opening part 150 accommodates the card storage part 120, and the card storage part 120 may be decoupled/coupled from/to the case main body 100 through the opening 150.

In the boundary line frame 160, first coupling protrusions 129 may be formed to which slide hooks 300 configured to elastically couple the case main body 100 and an opening/closing cover 200 are connected. Unlike the case of above-mentioned example 1, in which since the case main body 100 and the card accommodation part 120 are integrated type, the first coupling protrusions 129 are formed on the bottom surface of the card storage part 120, example 2 has a structure in which the case main body 100 and the card accommodation part 120 may be decoupled/coupled, and thus, the first coupling protrusions 129 may be provided on the boundary line frame 160 formed in the opening part 150 of the case main body 100.

In addition, the first coupling protrusions 129 may be formed as first coupling grooves (not shown) which does not have a protrusion shape, but have a groove shape, and in this case, coupling protrusions (not shown) formed on connection end portions of the slide hooks may be coupled to the first coupling grooves, or the first coupling grooves may be coupled by means of coupling pins (not shown) passing through coupling through holes (not shown) formed on the connection end portions of the slide hooks to be coupled.

Meanwhile, the card storage part 120 may be decoupled/coupled from/to the case main body 100 on the front surface of the case main body 100, that is, in the direction of providing a cell phone accommodation part 110 in which a cell phone is accommodated.

Meanwhile, the opening 150 of the case main body 100 and the card storage part 120 decoupled/coupled corresponding thereto are designed in a standard type so as to accommodate a card without being limited to a specific cell phone model, and the overall shape, size, etc, may vary according to cell phone models.

As such, in example 2 of the present disclosure, the case main body 100 and the card storage part 120 are formed in a structure so as to be capable of being decoupled/coupled, and thus, the case main body 100 may be variously changed and used according to cell phone models or user's preference, and a card may be stored by means of the card storage part 120 coupled to the case main body 100. Thus, improved aesthetic property and effectiveness may be achieved.

2. Operation Process

With reference to drawings, an operation process of a cell phone case, having the above-described structure, in accordance with exemplary embodiments will be described.

2.1 Opening/Closing Cover Attachment Process

Figure 7:
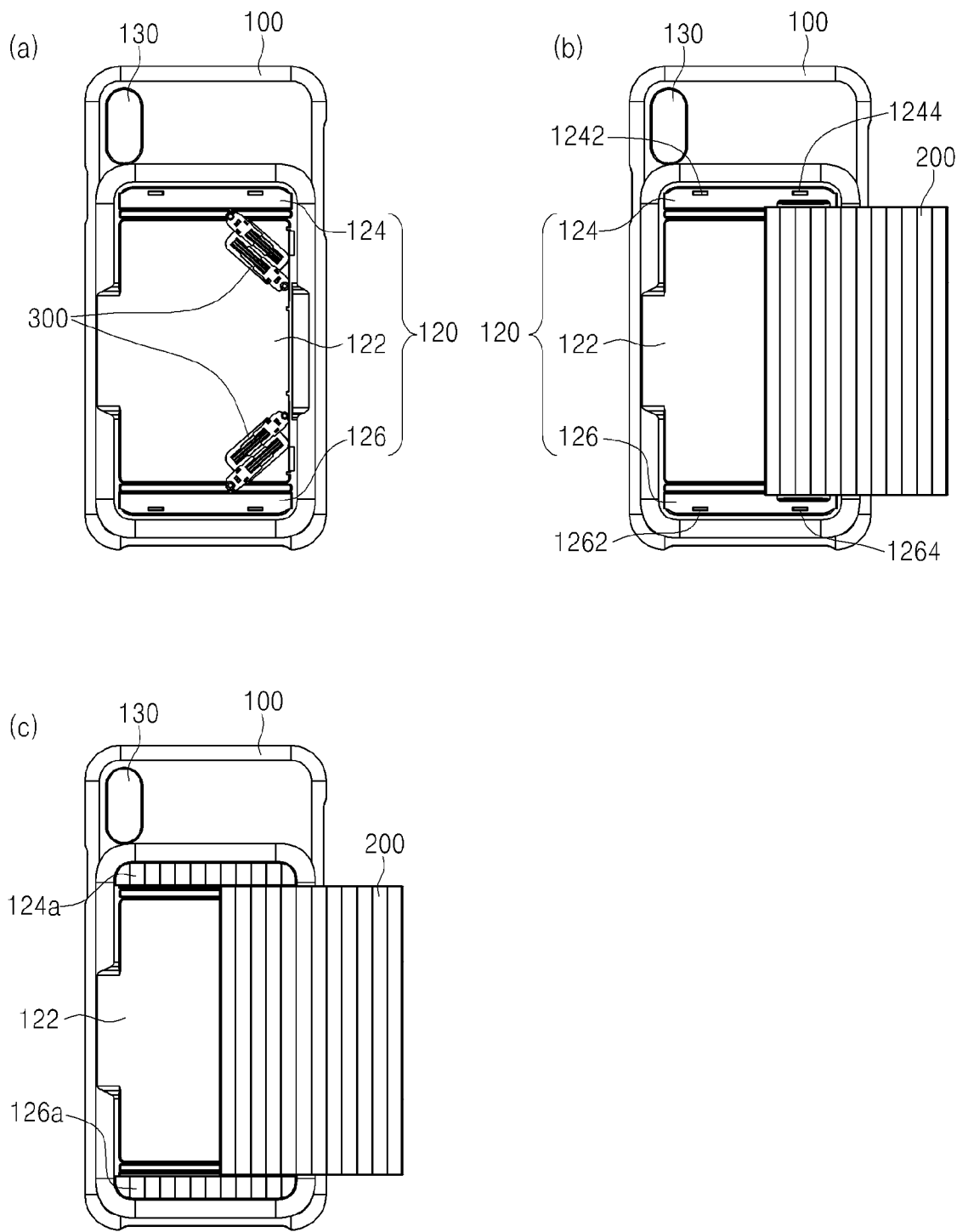
FIG. 7 is a view illustrating an attachment process of the opening/closing cover.

FIG. 7 is a view illustrating an attachment process of an opening/closing cover. (a) of FIG. 7 illustrates a state in which an upper/lower coupling part covers and an opening/closing cover are completely detached from a case main body, (b) of FIG. 7 illustrates a state in which the opening/closing cover is attached, and (c) of FIG. 7 illustrates a state in which the upper/lower coupling part covers are also attached.

Specifically, (a) of FIG. 7 illustrates a state in which the upper/lower coupling part covers 124*a* and 126*a* the opening/closing cover 200 are completely detached from the case main body 100 and slide hooks 300 are connected to a card storage part 120. The state, in which the slide hooks 300 are connected as in (a) of FIG. 7, is a state in which first coupling protrusions 129 formed on respective upper/lower portions of the bottom surface of the card storage part 120 and first coupling grooves 314 of the slide hooks 300 are respectively connected.

(b) of FIG. 7 illustrates a state in which the opening/closing cover 200 is attached in the state of (a) of FIG. 7. That is, in the state of (a) of FIG. 7, in which the first coupling protrusions 129 formed on the respective upper/lower portions of the bottom surface of the card storage part 120 and the first coupling grooves 314 of the slide hooks 300 are respectively connected, second coupling protrusions 220 formed on respective upper/lower portions of inner surface of the opening/closing cover 200 and second coupling grooves 324 of the slide hooks 300 are respectively coupled, and thus, the opening/closing cover 200 may be attached. That is, the case main body 100 and the opening/closing cover 200 are connected by using the slide hooks 300.

(c) of FIG. 7 is a state in which in the state of (b) of FIG. 7, the upper/lower coupling part covers 124*a* and 126*a* are attached to the upper/lower coupling parts 124 and 126 of the card storage part 120. The upper/lower coupling part covers 124*a* and 126*a* may be stably attached to the upper/lower coupling parts 124 and 126 such that a plurality of recess parts (not shown) formed inside the upper/lower coupling part covers 124*a* and 126*a* and a plurality of protrusion parts 1242, 1244, 1262, and 1264 formed on upper/lower ends of the bottom surface of the card storage part 120 are coupled. As such, according to the attachment of the upper/lower coupling part covers 124*a* and 126*a*, a sliding hinge accommodation part 128, which accommodates sliding hinges 210 of the opening/closing cover 200, is formed between the upper surface of the card storage part 120 and the opening/closing cover 200 by sliding hinge support structures 1242*a* and 1262*a* provided inside the upper/lower coupling part covers 124*a* and 126*a*, and thus, sliding and opening/closing of the opening/closing cover 200 are guided. That is, the structure, in which the upper/lower coupling part covers 124*a* and 126*a* are attached/detached to/from the upper/lower coupling parts 124 and 126, is configured so as to allow the opening/closing cover 200 to be completely attached/detached to/from the case main body 100.

A card may be inserted into the case main body 100 through the above-mentioned steps of (a) to (c) of FIG. 7. Specifically, as shown in (c) of FIG. 7, a card to be stored is inserted into the card mount part 122 of the card storage part 120, and then the opening/closing cover 200 may semi-automatically slide and open/close by the connection using the slide hooks 300. A sliding movement by using the elastic slide hooks 300 used in exemplary embodiments will be described in detail below.

2.2 Semi-Automatic Sliding Movement Process of Opening/Closing Cover

Figure 8:
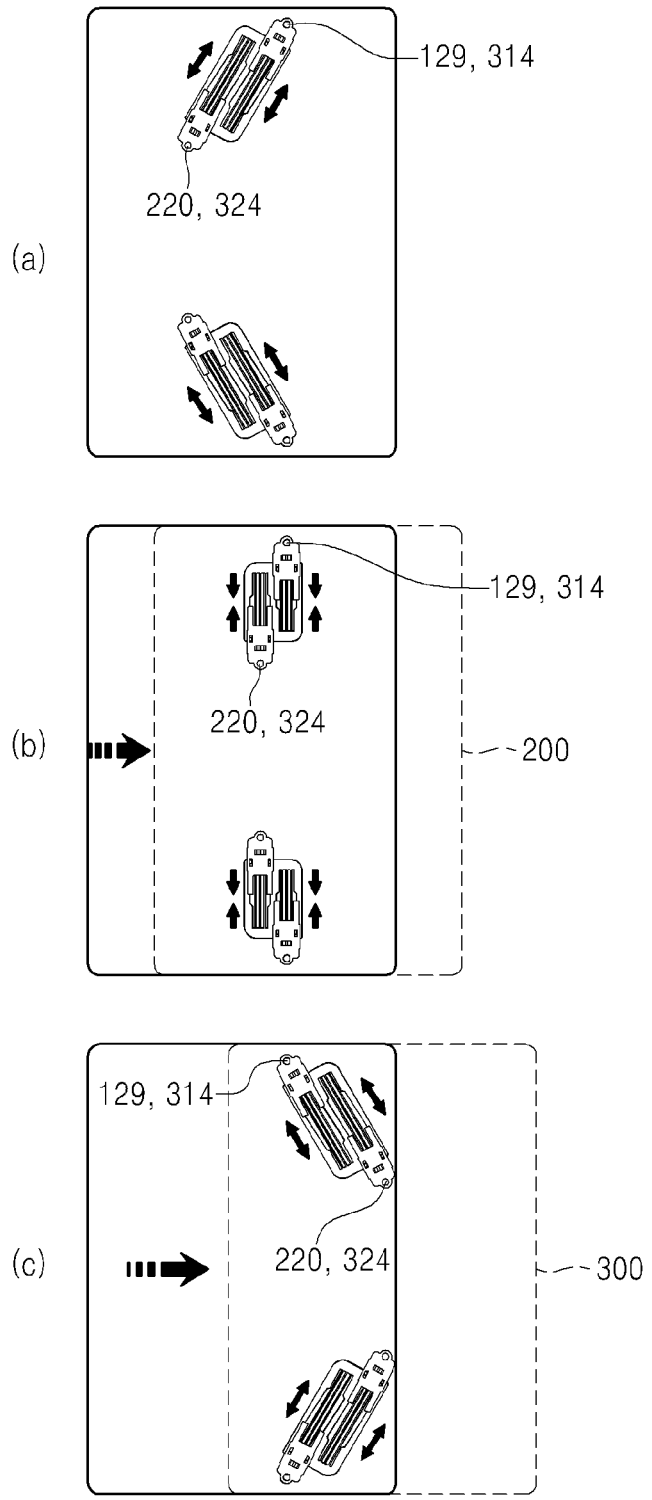
FIG. 8 is a view illustrating a state in which the slide hooks change according to a movement of the opening/closing cover.

FIG. 8 is a view illustrating a state in which the slide hooks change according to a movement of the opening/closing cover.

Referring to FIG. 8, (a) of FIG. 8 illustrates a state in which, when the opening/closing cover 200 completely covers the card mount part 122, the first coupling protrusions 129 and the second coupling protrusions 220 are respectively coupled to the first coupling grooves 314 and the second coupling grooves 324 of the slide hooks.

In the state in (a) of FIG. 8, a leftward inclinations occur in the first coupling pins 310 and the second coupling pins 320, so that the first springs 312 and the second springs 322 are slightly stretched due to spring elasticity.

(b) of FIG. 8 illustrates a state in which a user slightly pushes the opening/closing cover 200.

When the user applies a slight force to and pushes the opening/closing cover 200, while the opening/closing cover 200 is slightly pushed, the second springs 322 of the second coupling pins 320 coupled to the second coupling protrusions 220 is contracted and the first springs 312 of the first coupling pins 310 is also contracted. Accordingly, the first coupling pins 310 and the second coupling pins 320 have inclinations almost similar to straight lines.

(c) of FIG. 8 illustrates a step in which when a pushing force of a certain degree is applied to the opening/closing cover 200, the first springs 312 of the first coupling pins 310 and the second springs 322 of the second coupling pins 320, which have been contracted in the step in (a) of FIG. 8, are stretched and semi-automatically generate a force.

When the first springs 312 and the second springs 322 are contacted by a certain degree and then a slight pushing force is applied to the springs, the contracted springs are simultaneously stretched and semi-automatically generate a force. Accordingly, as shown in (c) of FIG. 8, while the first coupling pins 310 and the second coupling pins 320 have rightward inclinations, the first springs 312 and the second springs 322 are stretched.

As such, the case main body 100 and the opening/closing cover 200 are connected by using the slide hooks 300 including an elastic material, and thus, the opening/closing cover 200 may semi-automatically slide like the steps shown in (a) to (c) of FIG. 8.

In accordance with exemplary embodiments, a case main body and an opening/closing cover are connected by using elastic slide hooks, so that a space in which a card is stored can be semi-automatically opened/closed by sliding, and thus, card may be conveniently and easily input and output.

In addition, a case main body, a card storage part, and an opening/closing cover are configured so as to be capable of being easily decoupled/coupled, and thus, the case main body and the opening/closing cover may be variously changed and used according to preferences or needs.

While the technical idea of the present invention has been specifically described with respect to the above embodiments, it should be noted that the foregoing embodiments are provided only for illustration while not limiting the present invention. Those skilled in the art pertaining to the present invention could understand that various embodiments may be provided within the technical idea of the preset invention.

What is claimed is:

1. A cell phone case comprising:
   a case main body having a frame case shape and provided with, on a front surface thereof, a cell phone accommodation part configured to accommodate a cell phone in a shape of surrounding a rear surface and side surfaces of the cell phone;
   a card storage part formed so as to be decoupled/coupled from/to the case main body and configured to store a card; and
   an opening/closing cover provided on a rear surface of the case main body and configured to slide on and open/close the card storage part coupled to the case main body, wherein
   the case main body comprises an opening configured to accommodate the card storage part, and
   wherein the card storage part comprises:
   a card mount part on which a card is mounted; and
   upper/lower coupling parts configured to allow the opening/closing cover to be decoupled/coupled from/to the card storage part.

2. The cell phone case of claim 1, further comprising slide hooks configured to provide an elastic force when the opening/closing cover slides on and opens/closes the card mount part of the card storage part, wherein:
   a boundary line frame corresponding to boundary lines between the card mount part and the upper/lower coupling parts is provided on a predetermined region of an opening of the case main body;
   first coupling protrusions, connected to second end portions of the slide hooks configured to elastically couple the case main body and the opening/closing cover, are provided on the boundary line frame; and
   second coupling protrusions connected to first end portions of the slide hooks are provided on an inner surface of the opening/closing cover.

3. The cell phone case of claim 1, further comprising slide hooks configured to provide an elastic force when the opening/closing cover slides on and opens/closes the card mount part of the card storage part, wherein
   a boundary line frame corresponding to boundary lines between the card mount part and the upper/lower coupling parts is provided on a predetermined region of the opening of the case main body;
   first coupling grooves, connected to second end portions of the slide hooks configured to elastically couple the case main body and the opening/closing cover, are provided on the boundary line frame; and
   second coupling grooves connected to first end portions of the slide hooks are provided on an inner surface of the opening/closing cover; and
   coupling protrusions formed on the first end portions and the second end portions of the slide hooks are flexibly coupled to the respective first and second coupling grooves.

4. The cell phone case of claim 1, further comprising slide hooks configured to provide elastic force when the opening/closing cover slides on and opens/closes the card mount part of the card storage part, wherein
   a boundary line frame corresponding to boundary lines between the card mount part and the upper/lower coupling parts is provided on a predetermined region of the opening of the case main body;
   first coupling grooves, connected to second end portions of the slide hooks configured to elastically couple the case main body and the opening/closing cover, are provided on the boundary line frame;

second coupling grooves connected to first end portions of the slide hooks are provided on an inner surface of the opening/closing cover; and coupling through holes formed on the first end portions and the second end portions of the slide hooks are flexibly coupled to the respective first and second coupling grooves via first and second coupling pins.

\* \* \* \* \*